(12) United States Patent
McPartlan et al.

(10) Patent No.: US 6,850,613 B2
(45) Date of Patent: Feb. 1, 2005

(54) CUSTOMER SERVICE REQUEST ALLOCATIONS BASED UPON REAL-TIME DATA AND FORECAST DATA

(75) Inventors: Kevin McPartlan, San Jose, CA (US); Edward Komissarchik, San Jose, CA (US); Lauren O'Brien, Redwood City, CA (US); Robert Hayes, Nashville, TN (US); Katherine McElroy, Nashville, TN (US); John Rafter, Nashville, TN (US); Gary Sorensen, San Jose, CA (US); David Glassman, San Jose, CA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 10/464,305

(22) Filed: Jun. 17, 2003

(65) Prior Publication Data

US 2003/0215083 A1 Nov. 20, 2003

Related U.S. Application Data

(63) Continuation of application No. 09/384,789, filed on Aug. 27, 1999, now Pat. No. 6,584,191.

(51) Int. Cl.[7] .......................... H04M 3/00; H04M 5/00; G06F 17/60
(52) U.S. Cl. ..................... 379/265.02; 379/219; 705/10
(58) Field of Search .................. 379/219, 220.01, 379/265.02, 265.03, 265.05, 266.08, 221.06, 309; 705/7–11, 26

(56) References Cited

U.S. PATENT DOCUMENTS

| | | | |
|---|---|---|---|
| 5,185,780 A | 2/1993 | Leggett | |
| 5,289,368 A | 2/1994 | Jordan et al. | |
| 5,335,268 A | 8/1994 | Kelly, Jr. et al. | |
| 5,546,452 A | 8/1996 | Andrews et al. | |
| 5,590,188 A | 12/1996 | Crockett | |
| 5,848,143 A | 12/1998 | Andrews et al. | |
| 5,911,134 A | * 6/1999 | Castonguay et al. | ........... 705/9 |
| 6,044,355 A | 3/2000 | Crockett et al. | |
| 6,115,693 A | 9/2000 | McDonough et al. | ......... 705/10 |

* cited by examiner

Primary Examiner—Benny Tieu
(74) Attorney, Agent, or Firm—Blakely, Sokoloff, Taylor & Zafman LLP (57) ABSTRACT

A method and apparatus for performing customer service request allocations based upon real-time data and forecast data, calculates estimated handling resources for each of the transaction processing systems based upon actual handling resources and scheduled handling resources. Customer service transaction workloads are forecasted for the handling resources for each of the transaction processing systems. Then, customer service request allocations are determined using estimated handling resources and the forecasted customer service transaction workload.

18 Claims, 11 Drawing Sheets

CUSTOMER SERVICE REQUEST ALLOCATIONS BASED UPON REAL-TIME DATA AND FORECAST DATA

This application is a continuation of U.S. application Ser. No. 09/384,789, filed Aug. 27, 1999 now U.S. Pat. No. 6,584,191.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of transaction processing. More particularly, an exemplary embodiment of the invention relates to a method and apparatus for statistically distributing transactions among transaction processing systems of a virtual transaction processing center based on scheduled staffing levels and real-time observed actual positions staffed.

2. Description of the Related Art

Call centers are sites at which incoming customer phone calls, such as 800 calls, are received and answered by agents. Typically, each call center is staffed by agents associated with one or more skill groups or agents having experience with one or more types of applications/calls. In this manner, a particular call may be routed to an agent having an appropriate level of expertise for handling the call. For example, an agent might belong to a skill group that services Spanish-speaking callers and/or a group that handles English-speaking callers.

Additionally, today's call centers are no longer centralized in a single location. As a result, enterprises must coordinate call centers across multiple physical sites. While workforce management software offers resource planning solutions, including forecasts of call volumes and arrival patterns, and staffing calculations based on desired service quality, a difficult issue in multisite call center integration is balancing call loads among multiple locations.

One of two approaches is typically employed for performing dynamic call distribution to achieve load balancing, (1) routing on an individual call-by-call basis and (2) percentage-allocation routing. In general, call-by-call routing typically involves the use of a carrier feature, such as AT&T's Intelligent Call Processing (ICP), MCI's Intelligent Call Router (ICR), or Sprint's Sprint Interface to External Routing Processor (SITERP), that allows a telephone customer to which a call is destined the opportunity to select call routing terminations on a call-by-call basis. Briefly, upon receiving an incoming 800 call, for example, the carrier's Service Control Point (SCP) server sends a route request, including various call characteristics, such as the dialed number identification service (DNIS), the calling party's number/billing number (ANI), and/or caller entered digits (CED), e.g., account number, credit card number, social security number, or other identification number, to a route controller at the called organization's premises. The organization's route controller (referred to as a Customer Routing Point (CRP), a Customer Access Point (CAP), and a Customer Routing Processors (CRP) by AT&T, MCI and Sprint, respectively) provides a routing decision to the SCP based upon real-time data collected from the organization's call centers, including handling resources (e.g., agents) at each center, call load, skills, and agent availability. Finally, the carrier routes the call to the destination indicated by the route controller.

In contrast, percentage-allocation routing does not individually process each incoming call based on real-time data to arrive at a routing decision. Rather, percentage-allocation routing refers to a mechanism that distributes calls to call centers according to preset percentage allocations associated with each of an organization's call centers for the current time segment. Briefly, based upon scheduled staffing levels, historical call data (e.g., call volume, average handle time), and the desired service quality for each call center, percent allocations for one or more future time segments are generated for the call centers and uploaded to the carrier network. Subsequently, routing is performed internal to the carrier network according to the preset percentages corresponding to the current time segment. AT&T's Quick Call Allocator is an example of such a routing management service.

Figure 1:
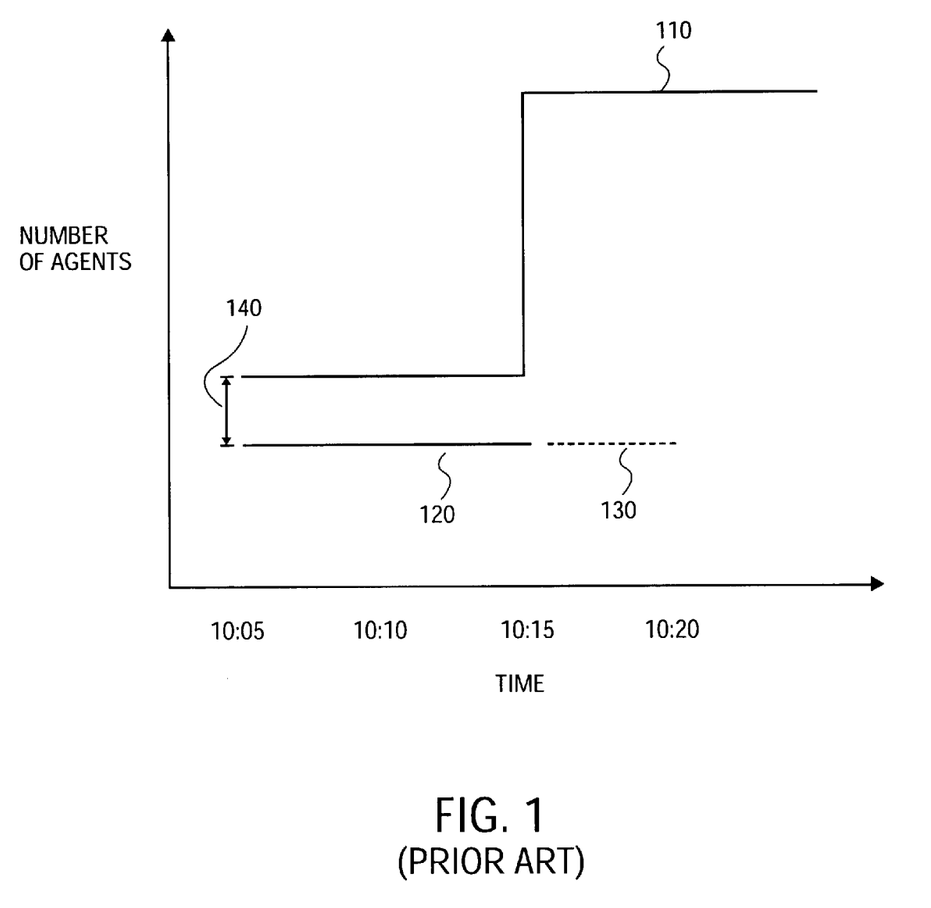
FIG. 1 is a graph showing prior art scheduled and estimated staffing levels for a call center.

Having described call-by-call routing based upon real-time data and percentage-allocation routing based upon schedule data, some limitations of these prior approaches will now be illustrated with reference to FIG. 1. FIG. 1 is a graph showing scheduled and estimated staffing levels for a call center. The thin solid line 110 represents scheduled staffing levels, the thick solid line 120 represents the actual staffing level from 10:05 to 10:15, and the thick dashed line 130 represents the estimated staffing level based upon the actual staffing 120 level. According to this example, neither the schedule 110 nor the real-time prediction 130 are correct. The schedule 110 incorrectly shows the number of agents for the period of 10:05 to 10:15 since, during that time period, several agents 140 did not show up. The real-time prediction 130 for the period beginning at 10:15 incorrectly estimates the actual number of agents because it lacks knowledge regarding the scheduled increase in the number of agents at 10:15. As a result, employing percentage-allocation routing based upon the schedule data 110 overloads the call center while call-by-call routing based upon real-time prediction 130 under-utilizes the call center. Since pre-call routing products are based on real-time data only, which is independent of forecast call volume, they are by definition reactive.

A further disadvantage of the above-described call-by-call approach is the expense of implementing the solution. Call-by-call solutions have significant up-front costs for route controller hardware and software and substantial ongoing variable costs such as a service subscription with the carrier that typically includes charges for each call that is pre-routed.

In light of the foregoing, what is needed is an intelligent, cost-effective call distribution mechanism. In addition, it would be advantageous to have a pre-call routing solution that is proactive and achieves a better balance of call loads among multiple locations by more accurately predicting the actual number of agents for a future time interval.

BRIEF SUMMARY OF THE INVENTION

A method and apparatus for performing customer service request allocations based upon real-time data and forecast data are described. According to one aspect of the present invention, estimated handling resources are calculated for each of the transaction processing systems based upon actual handling resources and scheduled handling resources. Customer service transaction workloads are forecasted for the handling resources for each of the transaction processing systems. Then, customer service request allocations are determined using estimated handling resources and the forecasted customer service transaction workload.

According to another aspect of the present invention, the actual handling resources associated with each of several transaction processing systems are measured at a first time instance. The scheduled handling resources associated with the transaction processing system is identified at the first time instance and a second time instance. In another embodiment of the present invention, at least some portion of the customer service transaction workload for the handling resources originates from non-distributed transaction requests.

According to yet another aspect of the present invention, a relationship is determined between actual handling resources and scheduled handling resources associated with each of several transaction processing systems. The estimated handling resources for each transaction processing system is calculated based upon the actual handling resources and the scheduled handling resources, including projecting estimated handling resources based upon the relationship. In another embodiment of the present invention, the determining of the relationship between the actual handling resources and the scheduled handling resources includes determining a user-defined relationship between the actual handling resources and the scheduled handling resources.

According another aspect of the present invention, the customer service request allocations among the plurality of transaction processing systems include allocations based upon a user-defined fixed allocation associated with one or more of the transaction processing systems. In another embodiment, the user-defined fixed allocation is a fixed allocation percentage associated with one or more of the transaction processing systems.

In yet another aspect of the present invention, the distribution of customer service requests among transaction processing system includes the determining at a first time instance a ratio of actual handling resources associated with each transaction processing system to scheduled handling resources for each of the transaction processing systems. The estimated handling resources are calculated for each of the transaction processing systems at a second time instance based upon the ratio and scheduled handling resources for each transaction processing system at the second time instance Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for performing staffing-based percentage-allocation routing using real-time data are described. Broadly stated, according to the present invention, transactions may be routed to one of a number of transaction processing systems according to preset allocation percentages that are derived from a combination of real-time actual staffing information and scheduled staffing levels. For example, according to one embodiment of the present invention, using schedule information in combination with current actual staffing information acquired directly from automatic call distributors (ACDs) in each call center of a virtual call center, one or more allocation sets may be periodically generated and uploaded to an interexchange carrier (IXC). Incoming calls are subsequently routed to an appropriate ACD according to the allocation percentages specified by the current allocation set. In this manner, a cost-effective, proactive, dynamic pre-call routing mechanism may be achieved. According to another aspect of the present invention, the schedule information may additionally be adjusted based on site-specific factors, such as local call traffic and average handle time (AHT) to arrive at the percentage of calls that should be distributed to each location. These and other enhancements seek to provide a powerful and flexible pre-call routing solution.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/ machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Importantly, while embodiments of the present invention will be described with reference to call centers, the method and apparatus described herein are equally applicable to other types of transaction processing environments. Additionally, while embodiments are illustrated with reference to ACDs, the method and apparatus described herein are also applicable to various other transaction processing systems, such as email, video, fax, IP telephony, and web servers. Furthermore, although embodiments of the present invention are described assuming handling resources are agents, the transaction distribution calculations described herein are generally applicable to other types of handling resources, such as computer telephony integration (CTI) terminals, computers, data reception/processing devices, interactive voice response (IVR) ports, transaction agent telephone/service terminals, or a variety of other devices capable of servicing transactions.

Terminology

Before describing the context in which various embodiments of the present invention may be employed, some terms that will be used throughout this application will briefly be defined.

A "transaction processing system" generally refers to a computer system capable of handling one or more types of transactions. According to embodiments of the present invention, transaction processing systems include ACDs, email, video, fax, IP telephony, and web servers, and the likes.

A "call center" generally refers to a transaction handling environment or site at which incoming customer transaction requests are received and serviced by one or more types of handling resources. For example, a call center may be a single location at which customer phone calls are received and answered by agents that staff the call center.

A "virtual call center" refers to one or more potentially geographically dispersed call centers that a managed in such a way that they have the appearance of being a single call center from the customers' perspective.

A "handling resource" refers to something that is capable of servicing transactions, such as a human agent, a computer telephony integration (CTI) terminal, a computer, a data reception/processing device, a interactive voice response (IVR) port, a transaction agent telephone/service terminal, or a variety of other devices.

"Scheduled handling resources" refer to the number of handling resources planned for a particular time interval.

"Actual handling resources" generally refer to the actual number of handling resources present during a particular time interval.

"Estimated handling resources" typically refers to a predicted number of handling resources projected for a future time interval.

"Pre-call routing" generally refers to routing decisions that are made before a call or other transaction terminates at a call center.

"Post-call routing" generally refers to routing decisions after a call or other transaction has been received by a call center.

"Percentage-allocation routing" refers to a mechanism that distributes calls to call centers according to preset percentage allocations associated with each of an organization's call centers for the current time segment (typically a 15 to 30 minute interval).

An "allocation set" is typically used in connection with percentage-allocation routing and refers to a set of data provided by an organization to a carrier network interface which defines transaction distribution among the organization's transaction processing systems or call centers. For example, according to one embodiment, an allocation set defines percent allocations for one or more of the organization's transaction processing systems for one or more future time intervals.

"Call-by-call routing" typically involves the use of a carrier feature that allows a telephone customer to which a call is destined the opportunity to select call routing terminations on a call-by-call basis.

An Exemplary Virtual Call Center Environment

Figure 2:
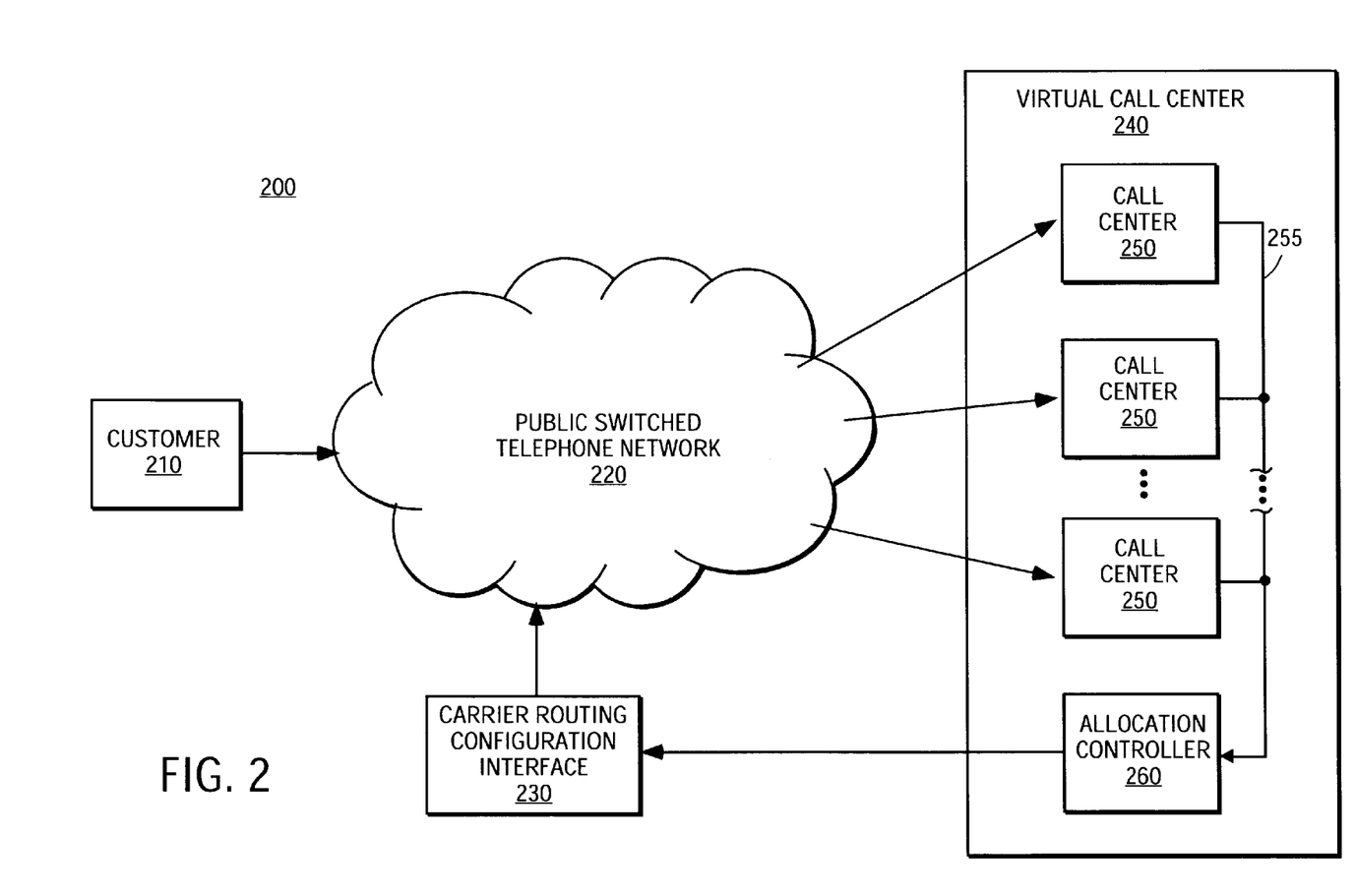
FIG. 2 illustrates a virtual call center environment in which one embodiment of the present invention may be implemented.

FIG. 2 illustrates a virtual call center environment 200 in which one embodiment of the present invention may be implemented. According to this example, a virtual call center 240 is comprised of a plurality of call centers 250 and an allocation controller 260 communicatively coupled by a wide area network (WAN) 255. Each call center 250 represents a site at which incoming customer transactions, such as 800 phone calls, may be received and handled by agents trained in one or more types of applications. As a result of today's decentralization, the call centers 250 may each reside in different locations around the globe. The call centers 250 may further integrate multiple products, such as ACDs and IVRs, from a variety of vendors. Importantly, in other transaction handling environments, incoming transactions may comprise voice communications (i.e., phone calls), electronic transactions, such as electronic mail, computer data exchange, faxes, video sessions, or other data forms capable of conveying service requests, including interactions by way of a web site, for example. As such, the virtual call center environment merely serves as an example of one of the many transaction handling environments in which the present invention may be employed.

The allocation controller 260 is also coupled to one or more carrier routing configuration interfaces 230 by a dial-up modem connection, dedicated phone line, RS-232, Ethernet, or some other communication medium. The allocation controller 260 provides dynamic call routing adjustment by providing allocation sets which include percent allocations for each of the potentially geographically dispersed call centers 250 to the carrier routing configuration interface 230, such as AT&T's Routing Manager II, Route It!, or the like. The allocation controller 260 gathers both schedule and real-time information from each of the call centers 250 and combines them to generate allocation sets for one or more forecast periods as will be described further below. While in this example, the allocation controller 260 and the carrier routing configuration interface 230 are shown to be separate from the call centers 250, one or both may be co-located with a call center 250.

A customer 210 that has dialed an organization's 800 number, for example, may be connected to one of the call centers 250 by way of the public switched telephone network (PTSN) 220. The customer's call is routed to one of the call centers 250 based upon the current allocation set.

An Exemplary Call Center

Figure 3:
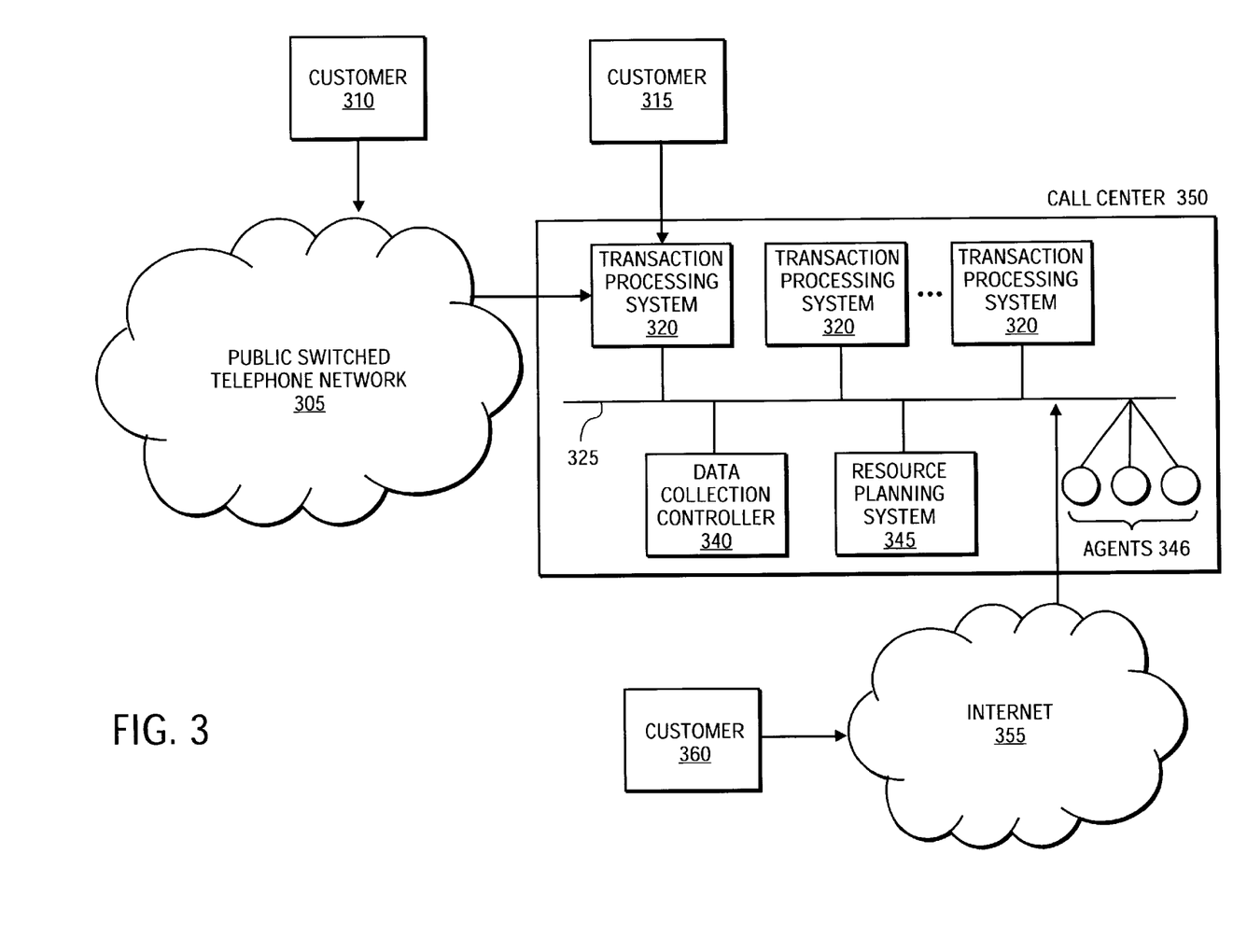
FIG. 3 illustrates call center equipment according to one embodiment of the present invention.

FIG. 3 illustrates call center equipment according to one embodiment of the present invention. Importantly, a call center is not limited to handling telephone calls. To illustrate the breadth of what is being referred to herein as a "call center," in this example, customers 310, 315, and 360 are shown accessing a call center 350 via the public switched telephone network (PSTN) 305, a local line, or the Internet 355, respectively. The call center 350 depicted includes one or more transaction processing systems 320, a resource planning system 345, and a data collection controller 340 connected by a local area network (LAN) 325.

The one or more transaction processing systems 320 may receive customer requests by way of the PSTN 305, the Internet 355, or other public or private communication network, such as a paging network. One or more agents 346 may handle customer requests arriving at the transaction processing systems 320. Exemplary transaction processing systems 320 include email, fax, video, and web servers, and/or automatic call distributors (ACDs). Therefore, customer requests may take the form of phone calls, voice mail, email messages, facsimile requests, and HTML form submissions, for example. In alternative embodiments other forms of customer interaction are envisioned, such as communications by way of one-/two-way paging, video, and/or other forms of communication.

The resource planning system 345 automatically creates future work schedules based on call volume forecasts and staffing requirements. Call volume estimates may take into account historical call volumes, seasonal patterns, day-of-week patterns, and special events, such as sales promotions and product introductions. Additionally, the resource planning system 345 may also provide a user interface to accept and record schedule exceptions. In one embodiment, the resource planning system 345 comprises the TeleCenter System, the World's Leading Resource Planning System, available from TCS Management Group, Inc. of Brentwood, Tenn. In alternative embodiments, the resource planning system 345 may be omitted and schedules and call volume forecasting may be performed manually.

As will be discussed further below, the data collection controller 340 may be a computer system that, among other things, monitors and records status information from the one or more transaction processing systems 320, processes the status information, and communicates allocation parameters needed for the percent allocation calculation to the allocation controller 260 via the WAN 255. The data collection controller 340 may also provide a user interface to define routing workflows, configure system, component and interface parameters, view real-time status, alarms, and reports, and other call center configurations. While the data collection controller 340 and the resource planning system 345 are shown as separate systems, in other embodiments the two systems may be combined onto one computer system.

An Exemplary Computer System

Figure 4:
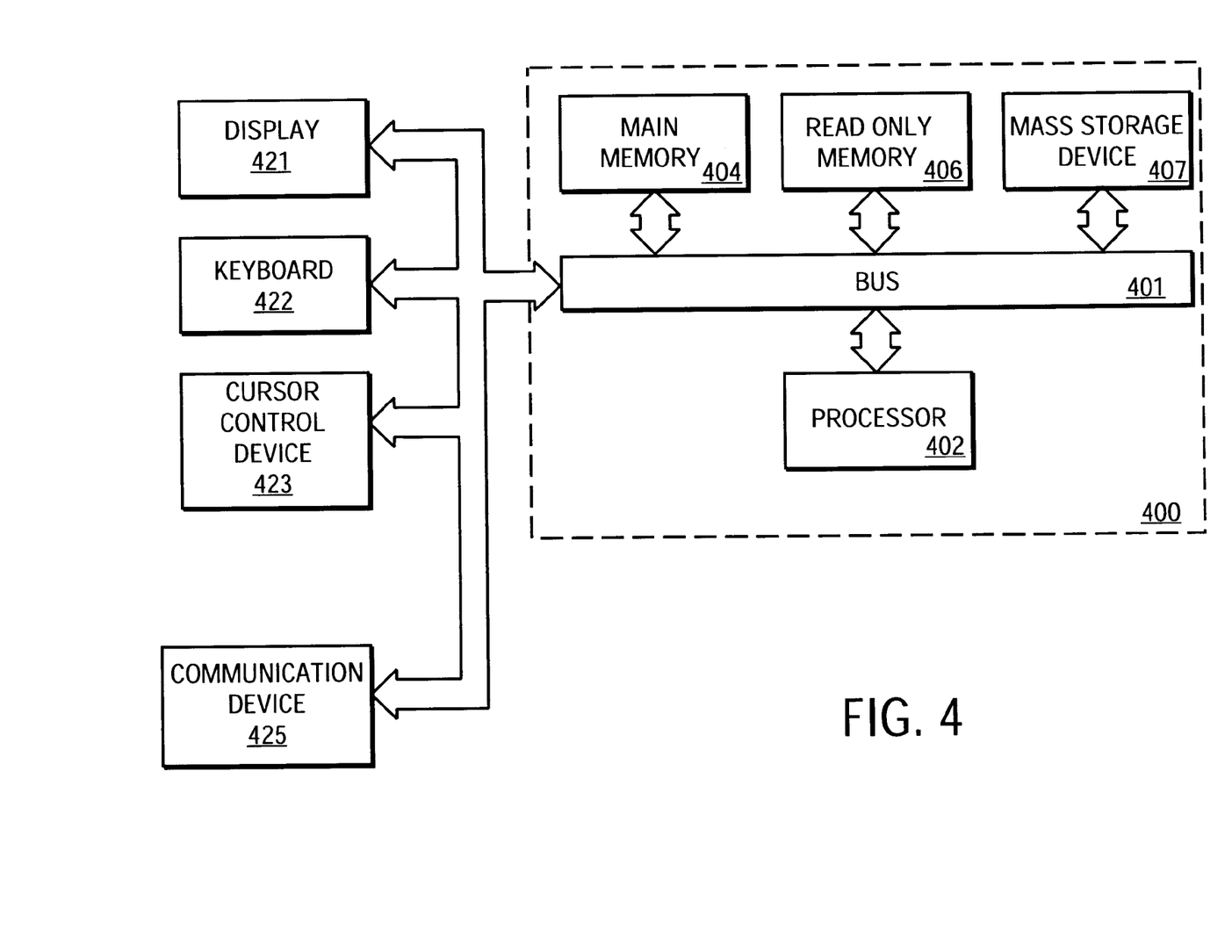
FIG. 4 is an example of a computer system upon which one embodiment of the present invention may be implemented.

Having briefly described a virtual call center 240 which may employ various features of the present invention, an exemplary machine in the form of a computer system 400 representing an exemplary data collection controller 340, and/or allocation controller 260 in which features of the present invention may be implemented will now be described with reference to FIG. 4. Computer system 400 comprises a bus or other communication means 401 for communicating information, and a processing means such as processor 402 coupled with bus 401 for processing information. Computer system 400 further comprises random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also comprises read only memory (ROM) and/or other static storage device 406 coupled to bus 401 for storing static information and instructions for processor 402.

A data storage device 407 such as a magnetic disk or optical disc and its corresponding drive may also be coupled to computer system 400 for storing information and instructions. Computer system 400 can also be coupled via bus 401 to a display device 421, such as a cathode ray tube (CRT) or Liquid Crystal Display (LCD), for displaying information to a computer user. For example, reports presenting real-time and/or historical data, graphic icons for workflow creation, and other types of data may be presented to an agent or administrator on the display device 421.

Typically, an alphanumeric input device 422, including alphanumeric and other keys, is coupled to bus 401 for communicating information and/or command selections to processor 402. Another type of user input device is cursor control 423, such as a mouse, a trackball, or cursor direction keys for communicating direction information and command selections to processor 402 and for controlling cursor movement on display 421.

A communication device 425 is also coupled to bus 401 for providing access from/to clients/servers, such as the allocation controller 260, the data collection controller 340, the resource planning system 345, and/or other clients/servers via the Internet, for example. The communication device 425 may include a modem, a network interface card, or other well known interface devices, such as those used for coupling to Ethernet, token ring, or other types of networks. In any event, in this manner, the computer system 400 may be coupled to a number of clients/servers via a conventional network infrastructure, such as an enterprise's Intranet (e.g., WAN) and/or the Internet, for example.

Allocation and Routing Cycle

Figure 5:
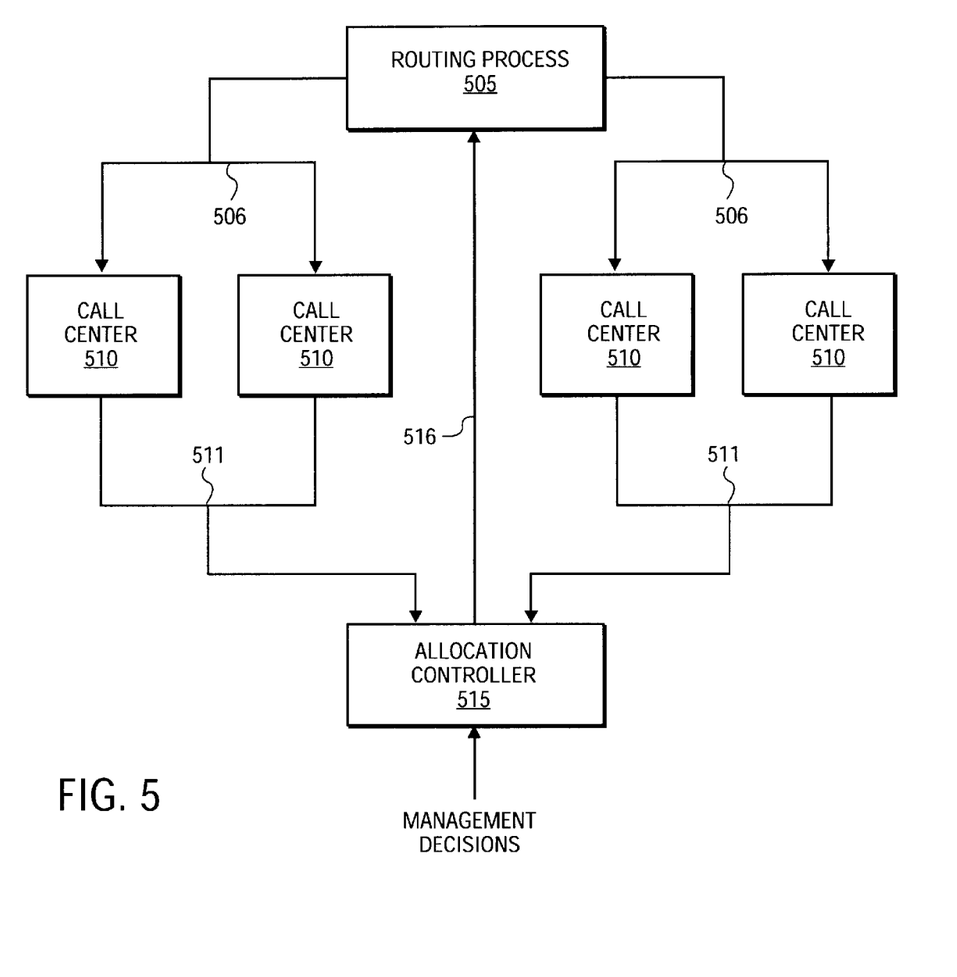
FIG. 5 conceptually illustrates an allocation and routing cycle according to one embodiment of the present invention.

FIG. 5 conceptually illustrates an allocation and routing cycle according to one embodiment of the present invention. Each call center 510 sends allocation calculation data 511 (also referred to as allocation parameters), such as schedule tallies, average handle time, and real-time actual staffing information to an allocation controller 515.

The allocation controller 515, using the allocation calculation data and parameters that are based on management decisions (e.g., desired service level, cost constraints), calculates allocation percentages for each call center 510, and provides the allocation percentages 516 to a routing process 505 of a public or private network, for example. Alternatively, the allocation percentages or other routing information may be provided to other entities, such as interactive voice response units (IVRs), Customer Interaction Systems (CISs), Enterprise Resource Planning Systems (ERP), and/or other devices with scheduled resources.

In the case of allocation percentages 516 being provided to an interexchange carrier (IXC), such as AT&T, MCI, or Sprint, the carrier's routing process 505 routes calls 506 to the appropriate call center based upon the allocation percentages for the current time period.

Figure 6:
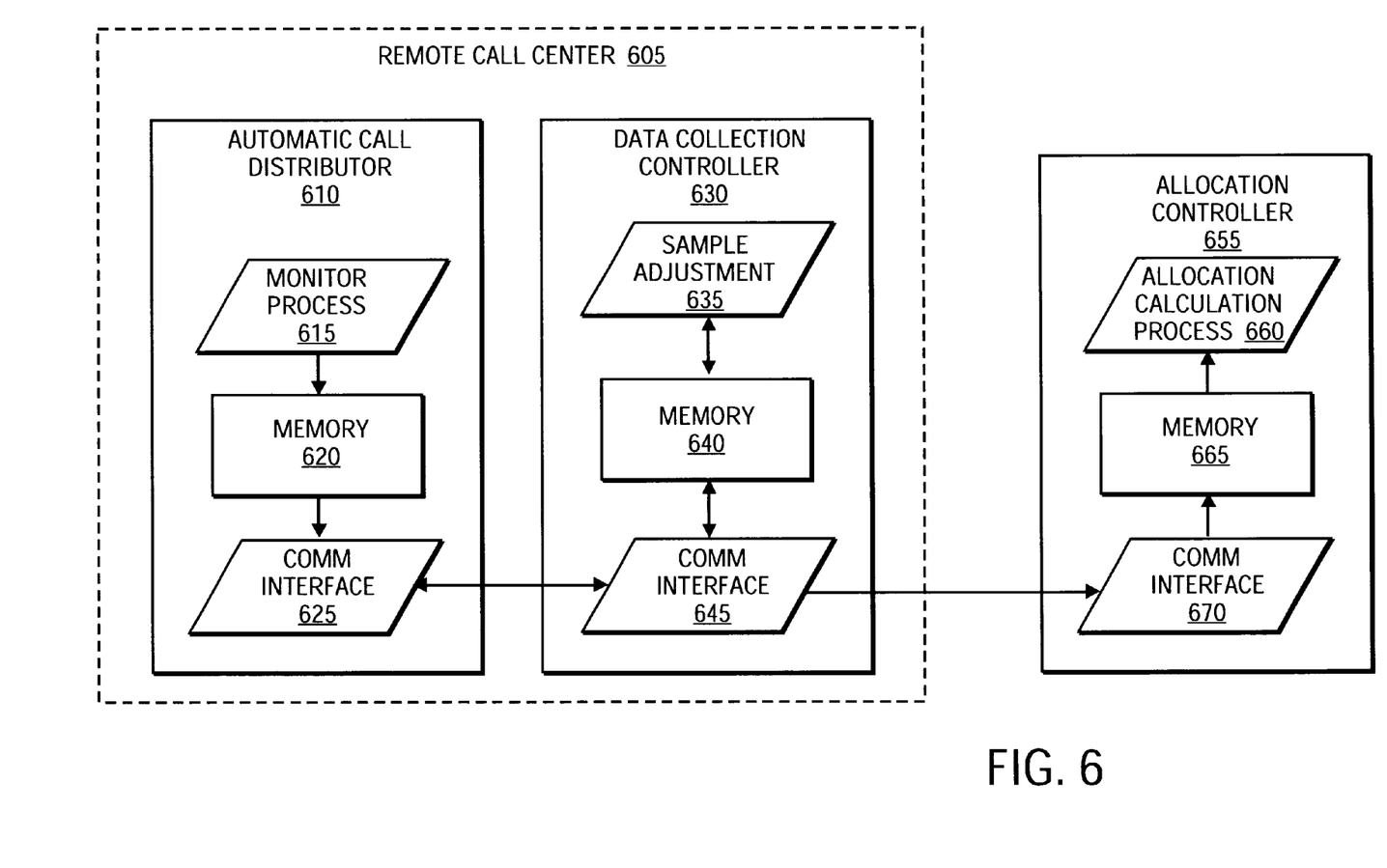
FIG. 6 is a block diagram illustrating the interaction of various processes according to one embodiment of the present invention.

FIG. 6 is a block diagram illustrating the interaction of various processes according to one embodiment of the present invention. In this example, a remote call center 605 includes an ACD 610 and a data collection controller 630. Preferably, the ACD 610 is an Aspect ACD System available from Aspect Telecommunications, Incorporated of San Jose, Calif. The ACD 610, according to this example, includes a monitor process 615, a memory 620, and a communication interface 625. The monitor process 615 records real-time information to memory 620, such as the status of agents (e.g., available, idle, ready, reserved, talking, not ready, etc.) and various call statistics (e.g., calls offered, calls incoming, calls routed, calls abandoned, calls answered, calls handled, calls in progress, calls in queue, average handle time, average speed of answer, etc.).

The data collection controller 630 includes sample adjustment logic 635, a memory 640, and a communication interface 645. As will be described further below, the data collection controller 630 may collect snapshots of the ACD's real-time data at a first sampling frequency and temporarily store the snapshots in memory 640. The sample adjustment logic 635 may aggregate one or more snapshots and temporarily store the aggregated samples in memory 640. Importantly, in alternative embodiments, the data collection controller 630 may interface with and collect information from entities other than ACDs. For example, information may be collected from IVRs, fax, video, email and/or web servers. Also, in alternative embodiments, data collection may be triggered by asynchronous events rather than according to a predetermined schedule.

In this example, the allocation controller 655 includes an allocation calculation process 660, a memory 665, and a communication interface 670. The allocation controller 655 periodically receives the aggregated samples from the data collection controller 630 through the communication interface 645 at a second sampling frequency. Depending upon the implementation, the data may be pushed by the data collection controller 630 over a WAN connection or queried by the allocation controller 655. The allocation controller 655 additionally receives information regarding scheduled staffing levels from the data collection controller 630 or the resource planning system 345. Communication of the real-time information and scheduled staffing levels may be over a TCP/IP connection, for example. In one embodiment, the communications interfaces 625, 645, 670 may include one or more of Aspect's Real-time Bridge, Application Bridge®, and/or InfoAccess feed (Application Bridge is a registered trademark of Aspect Telecommunications, Incorporated of San Jose, Calif.).

Remote Call Center Processing

Having described the interaction of various processes according to one embodiment of the present invention, distributed remote call center processing will now be described with reference to FIG. 7. For purposes of this example, it is assumed that a number of call center sites are networked together so as to function as a virtual call center. The call center site that includes the allocation controller is referred to as the central call center site, while the remaining sites are referred to as remote call center sites.

Figure 7:
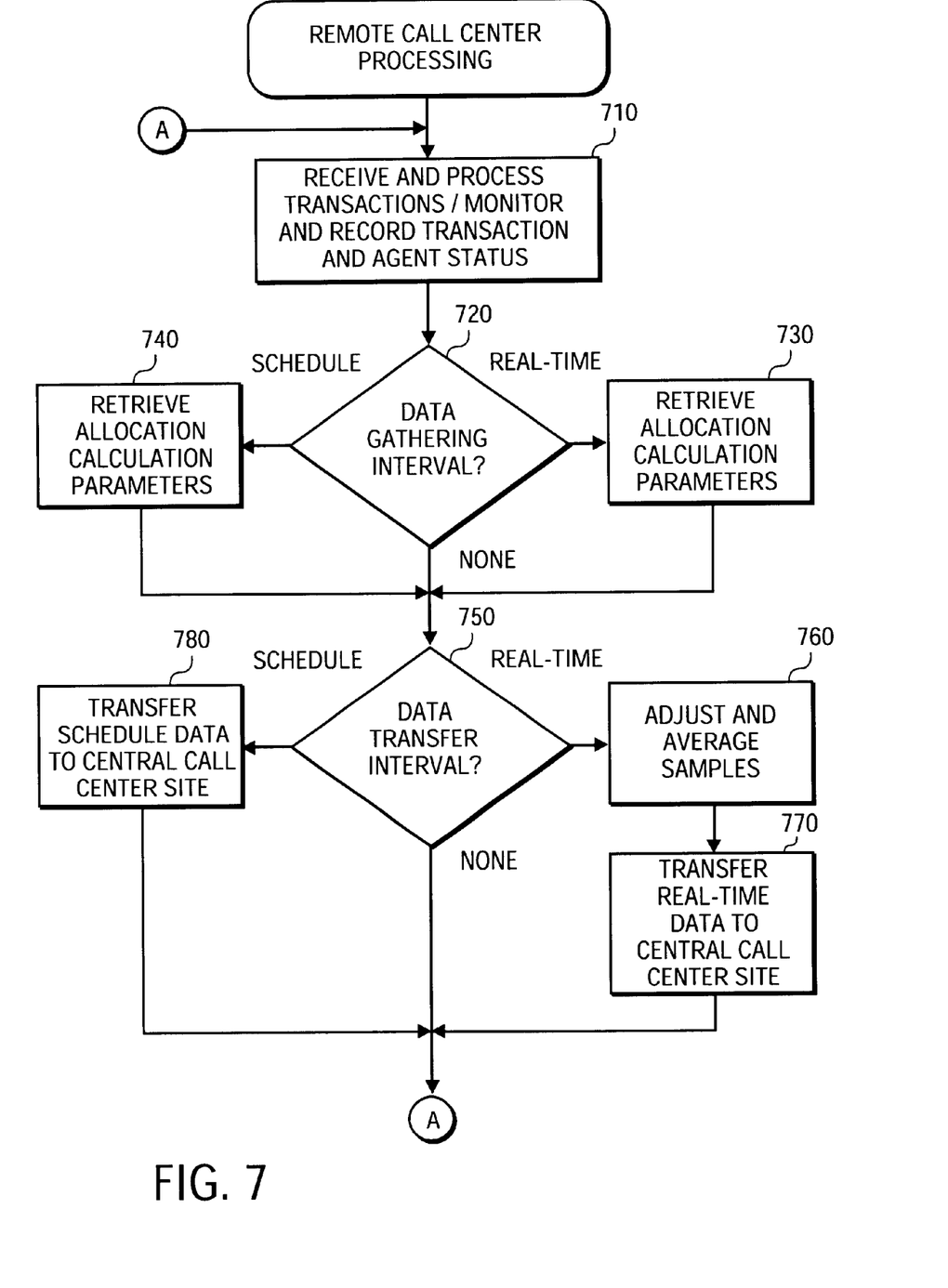
FIG. 7 is a flow diagram conceptually illustrating distributed remote call center processing according to one embodiment of the present invention.

FIG. 7 is a flow diagram conceptually illustrating remote call center processing according to one embodiment of the present invention. According to this embodiment, remote call center processing generally breaks down into a transaction processing and monitoring stage, a data gathering stage, and a data transfer stage. The transaction processing and monitoring stage is represented by step 710, the data gathering stage is represented by steps 720 through 740, and the data transfer stage includes steps 750 through 780. Briefly, as transactions are processed by agents associated with a transaction processing system, allocation calculation parameters are gathered, aggregated, and transferred by the data collection controller to the allocation controller. Then, as will be described further below, the allocation controller generates allocation sets for one or more forecast periods and causes future call distribution to be balanced among the transaction processing systems by uploading the allocation sets to an inter-exchange carrier (ICX) interface or directly to the carrier routing process.

The steps described below may be performed under the control of a programmed processor, such as processor 402, or the logic may be implemented and distributed among hardware, firmware, software, or a combination thereof within the transaction processing systems 320 and/or the data collection controller 340, for example.

According to this embodiment, at step 710, transactions are received and processed by the one or more transaction processing systems 320. Transaction and agent status are concurrently monitored and recorded for use in the allocation percentage calculation which is described below.

At step 720, a determination is made whether or not data gathering is to be initiated. Typically, the interval for gathering scheduling data is approximately 15 to 30 minutes and the interval for gathering real-time data is approximately 1 to 3 seconds. If the real-time gathering interval has elapsed, then the real-time allocation calculation parameters are retrieved from the transaction processing system (step 730). If the scheduling data gathering interval has also elapsed, then the allocation calculation parameters relating to schedule data are retrieved from the transaction processing system 320 or the resource planning system 345 (step 740). According to this example, after the real-time and/or schedule data have been retrieved or if neither gathering interval has elapsed processing continues with step 750. While, in this example, the remote call center is shown as retrieving parameters relating to schedule data, in alternative embodiments this data may be transmitted automatically according to a prearranged schedule from the transaction processing system 320 or the resource planning system 345 to the remote call center.

At step 750, it is determined whether or not data transfer is to be initiated. Typically, the interval for transferring schedule data is approximately 15 to 30 minutes and the interval for transferring real-time data is approximately 1 to 5 minutes. If the real-time transfer interval has elapsed, then processing continues with step 760.

At step 760, the 1 to 3 second sample data is adjusted and aggregated into samples consistent with the real-time transfer interval.

At step 770, the real-time data is transferred to the central call center site via the WAN 255. If the schedule transfer interval has also elapsed, then schedule data is also transferred to the central call center site (step 780). According to this example, after the real-time and/or schedule data have been transferred or if neither transfer interval has elapsed, then processing continues with step 710.

While the flow diagram gives the impression that the steps above are performed in a polling loop of some sort, it should be appreciated that the data gathering and transfer stages may be event or interrupt driven or triggered by the expiration of a timer, for example.

Percentage-Allocation Routing Processing

Figure 8:
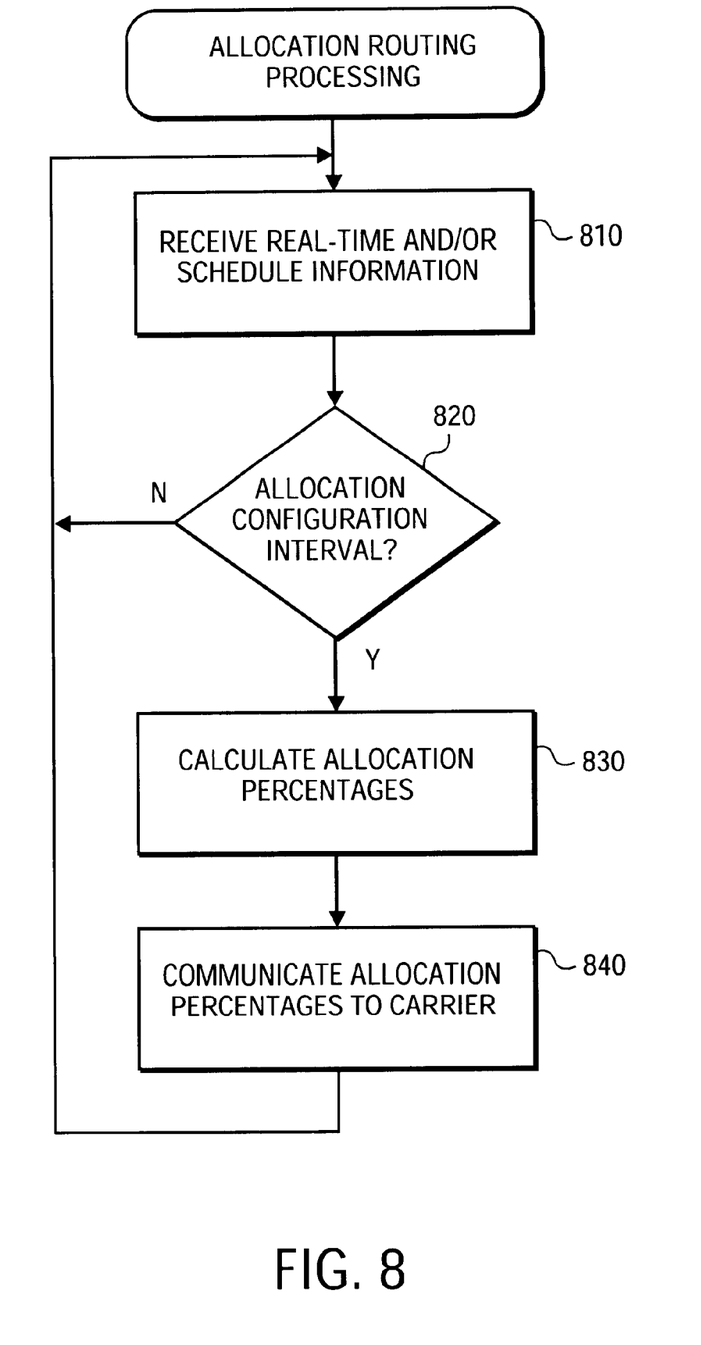
FIG. 8 is a flow diagram illustrating centralized percentage-allocation routing processing according to one embodiment of the present invention.

FIG. 8 is a flow diagram illustrating centralized percentage-allocation routing processing according to one embodiment of the present invention. At step 810, real-time and/or schedule information are received from each of the remote call center sites and the local call center site. At step 820, a determination is made whether or not percentage-allocation routing configuration is to be performed. Typically, the interval for configuring the carrier routing process is approximately 5 to 15 minutes. Preferably, however, this interval is adjustable by a call center administrator as charges may be incurred each time one or more allocation sets are uploaded to the carrier routing process. At any rate, if the percentage-allocation routing configuration interval has elapsed, then at step 830 allocation percentages are calculated based upon the real-time and schedule data received at step 810. Otherwise, processing continues with step 810. Following step 830, the allocation percentages for a future time interval are communicated to the carrier, at step 840. For example, the allocation percentages may be communicated to the carrier either directly to the carrier routing process via a dedicated line or modem connection or indirectly through a workstation, such as carrier routing configuration interface 650. This process continues with step 810.

Allocation Percentage Calculation

Figure 9:
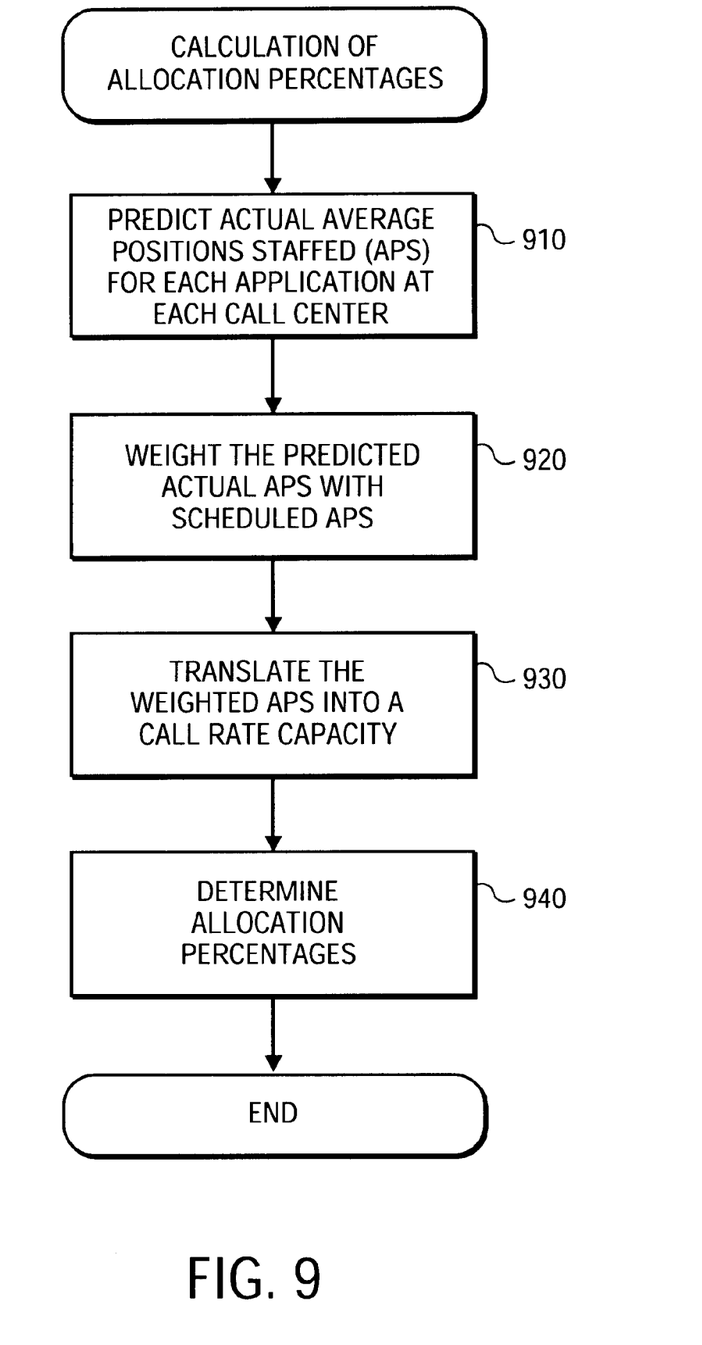
FIG. 9 is a flow diagram illustrating the calculation of allocation percentages according to one embodiment of the present invention.

FIG. 9 is a flow diagram illustrating the calculation of allocation percentages according to one embodiment of the present invention. As this embodiment is described, reference will be made to the following parameters:

Inputs

| | |
|---|---|
| n = | Number of application/call center pairs. |
| ρ = | Weighting of real-time data to scheduled data, $0 \leq \rho \leq 1$. |
| τ = | Latest real-time observation time. |
| π = | Real-time predictive period. |
| μ = | Number of allocation percentage periods. |
| $t_j$ = | Beginning time of allocation period j. |

-continued

| | |
|---|---|
| $Q(i, t)$ = | Desired service quality (e.g., x % calls answered in y seconds, or an average delay) for application/call center pair i at time t. |
| $R(i, t)$ = | Real-time observed average positions staffed (APS) for application/call center pair i at time t. |
| $S(i, t)$ = | Scheduled APS for application/call center pair i at time t. |
| $H(i, t)$ = | Average handle time for calls to application/call center pair i at time t. |
| $D(i, t)$ = | Ratio of directed (local) calls for application/call center pair i at time t to total call rate. |
| $U(t)$ = | Set of application/call center pairs that provide a fixed allocation percentage at time t. |
| $f(i, t)$ = | Fixed allocation percentage for application/call center pair i at time t. |

Intermediate Calculated Values

| | |
|---|---|
| $P(i, t)$ = | Predicted APS for application/call center pair i at time t. |
| $W(i, t)$ = | Weighted estimate of APS for application/call center pair i at time t. |
| $C(i, t)$ = | Call rate capacity for application/call center pair i at time t. |
| $C^-(i, t)$ = | Call rate capacity to be allocated for application/call center pair i at time t. |
| $C(t)$ = | "Total" call rate capacity for all application/call center pairs at time t. |
| $C_j^-$ = | "Total" call rate capacity to be allocated for all application/call center pairs that do not have fixed allocation percentages in allocation period j. |
| $F_j$ = | Total fixed allocation percentage for application/call center pairs in allocation period j. |

Outputs

| | |
|---|---|
| $A(i, j)$ = | Allocation percentage for application/call center pair i in allocation period j. |

At step 910, the average positions staffed (APS) for each application at each call center is predicted. In one embodiment the predicted APS, $P(i,t+n)$, may be determined based upon scheduled APS for time t+n and a relationship between observed real-time APS, $R(i,t)$, and scheduled APS, $S(i,t)$. A variety of different relationships between $R(i,t)$ and $S(i,t)$ may be employed. For example, the ratio between $R(i,t)$ and $S(i,t)$ may be assumed to be approximately constant over time. Alternatively, the difference between $R(i,t)$ and $S(i,t)$ may be used. The difference may be assumed to be constant over time or the difference may be adjusted to reflect observed historical, seasonal, and day-of-week patterns. In one embodiment, the predicted APS is determined by the following equation:

$$P(i, t) = \begin{cases} S(i, t)R(1, \tau)/S(i, \tau); \text{ if } S(i, \tau) \neq 0 \\ S(i, t); \text{ if } S(i, \tau) = 0 \text{ and } S(i, t) \neq 0 \\ R(i, \tau); \text{ otherwise} \end{cases} \quad \text{EQ\#1}$$

In equation #1, the first case is the most common situation where the ratio of APS to scheduled APS can be calculated without error. The second case represents situations, such as just before a call center opens, in which no one is currently scheduled but there are agents scheduled in the near future. The third case, represents situations in which no agents are scheduled at either time. If this is the case, then the real-time data is used for the predicted APS.

At step 920, the predicted APS is and scheduled APS are combined. For example, a predefined weighting may be applied to the predicted APS, $P(i,t)$ and the remainder of the weighted APS, $W(i,t)$, may be determined with reference to the scheduled APS, $S(i,t)$. To allow fine tuning of the resulting allocation percentages, the predefined weighting may be adjusted by a call center administrator. In one embodiment, the weighted APS, $W(i,t)$, is determined by the following equation:

$$W(i, t) = \begin{cases} \rho P(i, t) + (1-\rho)S(i, t); \text{ if } t \leq \tau + \pi \\ S(i, t); \text{ otherwise} \end{cases} \quad \text{EQ\#2}$$

During the predictive period, $\pi$, the real-time data is weighted against the scheduled data. Outside of the predictive period, the schedule data is used.

At step 930, the weighted APS is translated into a call rate capacity, $C(i,t)$. According to one embodiment, $C(i,t)$ may be determined by the following equation:

$$C(i,t)=E(W(i,t),H(i,t),Q(i,t)) \quad \text{EQ\#3}$$

where, $E(s,h,q)$ represents the workload that can be handled by s agents at a service quality, q, with an average service time, h, in an Erlang C queuing model.

At step 940, allocation percentages are determined for each application/call center pair using the call rate capacities. In one embodiment, the call rate capacities determined in step 930 may be used to determine allocation percentages for allocation period j according to the following:

$$A(i, j) = C(i, t)/C(t_j) \quad \text{EQ\#4}$$

where $\tau \leq j < \mu$ and $$C(t) = \sum_{i=0}^{n-1} C(i, t) \quad \text{EQ\#5}$$

In this manner, more calls are allocated to the application/call center pairs with higher call rate capacities.

Step 940 may additionally adjust for direct (local) traffic before determining the allocation percentages. Calls that are handled at each call center site that are not accepted by the Inter-exchange carrier and, therefore, not allocated by the IXC may be factored into the workload allocation by subtracting them from the total number of calls received across all sites using the following equations:

$$A(i,j)=C^-(i,t)/C(t_j) \quad \text{EQ \#6}$$

where, $$C^-(i, t) = \begin{cases} C(i, t) - D(i, t)C(t); \text{ if } D(t) < 1 \text{ and } C(i, t) > D(i, t)C(t) \\ C(i, t); D(t) \geq 1 \\ 0; \text{ otherwise} \end{cases} \quad \text{EQ\#7}$$

and $$D(t) = \sum_{i=0}^{n-1} D(i, t) \quad \text{EQ\#8}$$

In equation #7, under normal circumstances, represented by the first case, the direct call rate is subtracted from the call rate capacity of the application/call center pair. The second case treats situations in which the entire call rate for the network is direct as an error condition by ignoring the direct percentages. No calls are allocated to application/call center pairs falling into the last case which represents situations where the direct rate for the network is less than the "total" call rate capacity, but the direct call rate of an application/call center pair exceeds the call rate capacity for that application/call center pair.

In addition, step 940 may additionally adjust for user-defined, fixed allocation percentages. In general, those of the application/call center pairs that have been assigned fixed allocation percentages are assigned the user-defined, fixed allocation and the remaining percentage is distributed among the other application/call center pairs according to their respective call rate capacities. According to one embodiment, the following equations may be used to adjust for user-defined, fixed allocation percentages:

$$A(i,j) = \begin{cases} f(i,t_j)/F_j; & \text{if } F_j \geq 1 \text{ and } i \in U(t_j) \\ 0; & \text{if } F_j \geq 1 \text{ and } i \notin U(t_j) \\ f(i,t_j); & \text{if } F_j < 1 \text{ and } i \in U(t_j) \\ \dfrac{C^-(i,t_j)}{C_j^-}(1-F_j); & \text{otherwise} \end{cases} \quad \text{EQ \#9}$$

where $$F_j = \sum_{u \in U(t_j)} f(u, t_j) \quad \text{EQ \#10}$$

and $$C_j^- = \sum_{u \notin U(t_j)} C^-(u, t_j) \quad \text{EQ \#11}$$

Equation #10 calculates the total fixed allocation percentage and equation #11 calculates the total adjusted call rate for application/call center pairs without fixed allocation percentages. In addition to distributing calls among the application/call center pairs without fixed allocation percentages, equation #9 guards against fixed percentages totaling over 1. In the first two cases of equation #9, where the fixed allocation percentages total more than 100%, they are scaled to total 100% and the application/call center pairs without fixed allocation percentages are not allocated calls. In the latter two cases of equation #9, the fixed allocation percentages total less than 100%. Therefore, those application/call center pairs with fixed allocation percentages are allocated those percentages and the remaining percentage is distributed proportionately according to the call rate capacities of the remaining application/call center pairs.

Figure 10:
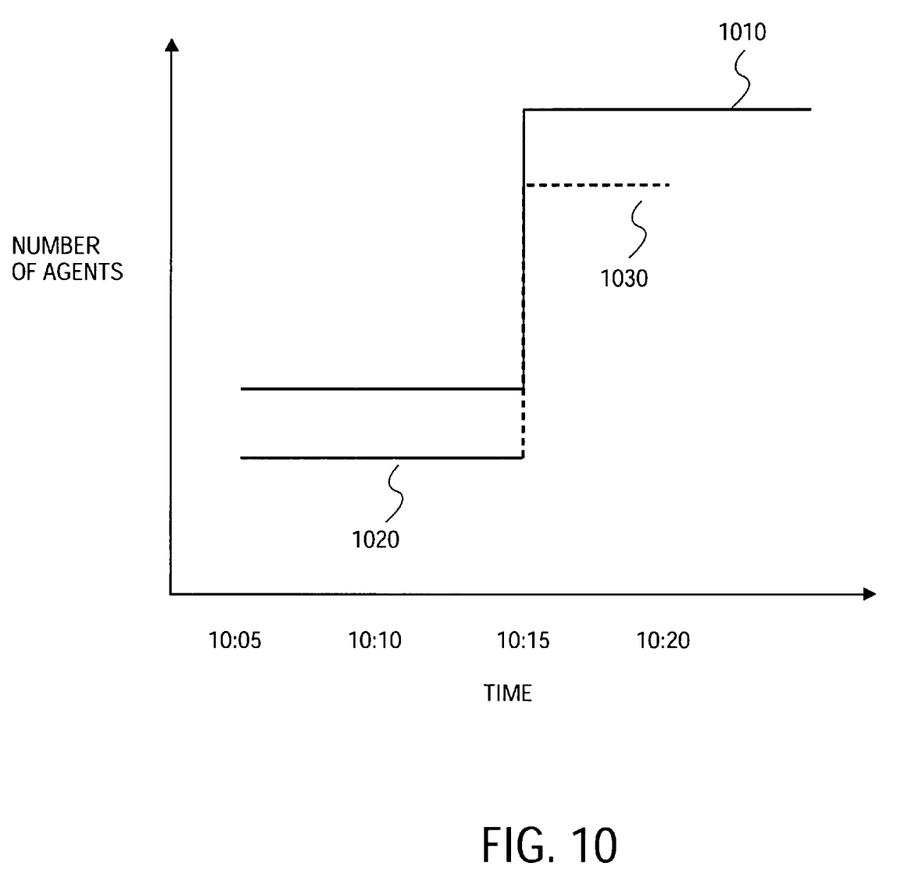
FIG. 10 is a graph showing scheduled and estimated staffing levels for a call center according to one embodiment of the present invention.

FIG. 10 is a graph showing scheduled and estimated staffing levels for a call center according to one embodiment of the present invention. As in FIG. 1, the thin solid line 1010 represents scheduled staffing levels, the thick solid line 1020 represents the actual staffing level from 10:05 to 10:15, and the thick dashed line 1030 represents the estimated staffing level. However, in contrast to the estimated staffing level of FIG. 1, here, the estimated staffing level for 10:15 to 10:20 more accurately represents the likely future staffing level. This is so, because both real-time staffing data and schedule staffing data are combined in the novel manner indicated herein. Advantageously, by more accurately predicting the actual number of agents for a future time interval, percentage-allocation routing based upon the estimated staffing level 1030 achieves a better balance of call loads among multiple locations than prior approaches.

Alternative Allocation Percentage Calculation

Figure 11:
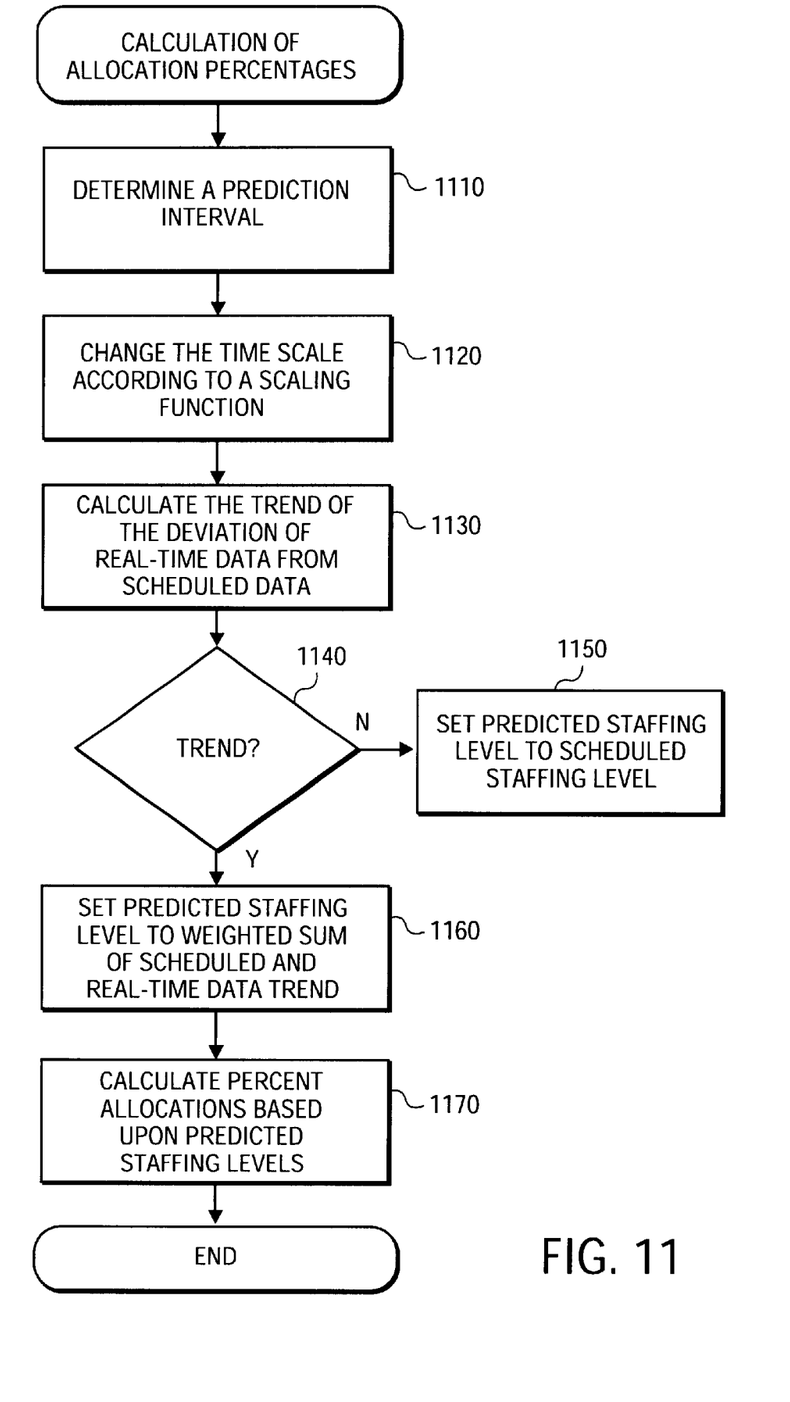
FIG. 11 is a flow diagram illustrating the calculation of allocation percentages according to another embodiment of the present invention.

FIG. 11 is a flow diagram illustrating the calculation of allocation percentages according to another embodiment of the present invention. As this embodiment is described, reference will be made to the following parameters and functions: Let r(t) be a function and f(t) be a forecast of r(t). Then, p(T) is a function that predicts r(T) based on f(t) and r(t) for t<T.

| | |
|---|---|
| OT = | Oscillation threshold: the maximum deviation allowed. |
| HB = | History beginning. |
| HE = | History end. |
| Prediction Interval = | The interval to be used for prediction, i.e., [T-HB, T-HE). |
| WR = | Weight of real-time information. |
| d(t) = | The deviation of real-time data from scheduled data, i.e., r(t) − f(t) |
| l(t) = | Linear approximation of d(t) for values of t in the Prediction Interval. Also referred to as the real-time data trend. |

According to the embodiment illustrated, at step 1110, a prediction interval is determined based upon the time for which a prediction is desired. Optionally, at step 1120, in order to allow more recent data to be relied upon more heavily than older data or vice versa, a scaling function may be applied to change the time scale. For example the latest data may be "stretched" and older data may be "shrunk" or all time elements may be treated as equally important. In this manner, different times in the prediction interval may be assigned different levels of importance.

After the optional scaling step, the trend of the deviation of real-time data from scheduled data may be calculated at step 1130. According to one embodiment, the least square method may be used to calculate a linear approximation or a trend, e.g., l(t), of the deviation, e.g., d(t), of real-time data from scheduled data. However, in alternative embodiments, higher order functions may be used.

At step 1140, it is determined whether or not a trend of the deviation can be determined. According to one embodiment, if the difference between the linear approximation and the deviation remains within a predetermined oscillation threshold, e.g., OT, then the trend determined is acceptable; otherwise no trend has been determined.

If a trend has been satisfactorily determined according to step 1140, then flow continues with step 1160; otherwise processing continues with step 1150. At step 1150, since no trend has been determined, the predicted staffing level, e.g., p(T), is set to the scheduled staffing level, e.g. f(T). At step 1160, the predicted staffing level is set to the weighted average of the scheduled staffing level and the real-time data trend, e.g., p(T)=WR*(l(T)+f(T))+(1−WR)*f(T).

Regardless of the method for calculating the predicted staffing level, processing continues with step 1170 at which point percentage allocations are calculated for time T based on the predicted staffing levels for each transaction processing system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of allocating customer service requests, the method including:
    calculating estimated handling resources for each of the plurality of transaction processing systems based upon actual handling resources and scheduled handling resources;

forecasting a customer service transaction workload for the estimated handling resources for each of the plurality of transaction processing systems; and determining customer service request allocations for each of the transaction processing systems based upon the estimated handling resources and the forecasted customer service transaction workload.

2. The method of claim 1, wherein the actual handling resources are measured at a first time instance.

3. The method of claim 2, wherein the scheduled handling resources associated with each of the plurality of transaction processing systems is identified at the first time instance and a second time instance.

4. The method of claim 1, further including:

determining a relationship between the actual handling resources and the scheduled handling resources, wherein the calculating of the estimated handling resources for each of the plurality of transaction processing systems based upon the actual handling resources and the scheduled handling resources includes projecting estimated handling resources based upon the relationship.

5. The method of claim 4, wherein the determining of the relationship between the actual handling resources and the scheduled handling resources includes determining a user-defined relationship between the actual handling resources and the scheduled handling resources.

6. The method of claim 1, wherein at least a portion of the customer service transaction workload for the estimated handling resources originates from call-by-call routing.

7. The method of claim 1, wherein the customer service request allocations among the plurality of transaction processing systems include allocations based upon a user-defined fixed allocation associated with one or more of the plurality of transaction processing systems.

8. The method of claim 7, wherein the user-defined fixed allocation is a fixed allocation percentage associated with one or more of the plurality of transaction processing systems.

9. The method of claim 1, wherein the determining of the customer service request allocations for each of the transaction processing systems includes determining a percentage of transactions to be allocated to each of the transaction processing systems.

10. The method of claim 1, including applying weighting factors to the actual handling resources and the scheduled handling resources.

11. The method of claim 1, including determining call rate capacities for each of the transaction processing systems based upon the estimated handling resources and a desired service level.

12. The method of claim 1, including determining call rate capacities for each of the transaction processing systems based upon the estimated handling resources and one or more cost constraints.

13. The method of claim 1, including determining call rate capacities for each of the transaction processing systems based upon the estimated handling resources and historical call data.

14. A method including:

determining a relationship between actual handling resources associated with each of a plurality of transaction processing systems and scheduled handling resources for each of the plurality of transaction processing systems at a first time instance; and calculating estimated handling resources for each of the plurality of transaction processing systems at a second time instance based upon the relationship and scheduled handling resources for each of the plurality of transaction processing systems at the second time instance.

15. The method of claim 14, wherein determining the relationship between actual handling resources associated with each of a plurality of transaction processing systems and scheduled handling resources for each of the plurality of transaction processing systems includes determining a ratio of the actual handling resources to the scheduled handling resources.

16. The method of claim 14, wherein determining the relationship between actual handling resources associated with each of a plurality of transaction processing systems and scheduled handling resources for each of the plurality of transaction processing systems includes determining a trend of the deviation of the actual handling resources from the scheduled handling resources.

17. A system for allocating customer service requests, the system including:

a wide area network (WAN);

a plurality of call centers coupled to the WAN, each of the plurality of call centers comprising a transaction processing system; and an allocation controller coupled to the WAN, the allocation controller configured to calculate estimated handling resources for each of the plurality of transaction processing systems based upon actual handling resources and scheduled handling resources, to forecast a customer service transaction workload for the estimated handling resources for each of the plurality of transaction processing systems, and to determine customer service request allocations for each of the transaction processing systems based upon the estimated handling resources and forecasted customer service transaction workload.

18. A machine-readable medium storing a sequence of instructions that, when executed by a machine, cause the machine to:

calculate estimated handling resources for each of the plurality of transaction processing systems based upon actual handling resources and scheduled handling resources;

forecast a customer service transaction workload for the estimated handling resources for each of the plurality of transaction processing systems; and determine customer service request allocations for each of the transaction processing systems based upon the estimated handling resources and forecasted customer service transaction workload.

* * * * *